United States Patent [19]
Ohtsubo et al.

[11] Patent Number: 4,926,361
[45] Date of Patent: May 15, 1990

[54] DIGITAL NOISE REDUCER

[75] Inventors: Hiroyasu Ohtsubo; Michio Masuda, both of Yokohama; Hideo Nishijima; Hitoaki Owashi, both of Katsuta; Masataka Sekiya, Mito; Kohji Minabe, Katsuta, all of Japan

[73] Assignee: Hitachi, Ltd., Tokyo, Japan

[21] Appl. No.: 245,208

[22] Filed: Sep. 16, 1988

[30] Foreign Application Priority Data

Sep. 22, 1987 [JP] Japan ............................ 62-236289
Feb. 29, 1988 [JP] Japan ............................ 63-44154

[51] Int. Cl.$^5$ ............................................... H04N 5/21
[52] U.S. Cl. ................................... 364/574; 358/167; 358/36
[58] Field of Search ............. 364/574; 358/167, 36; 381/94

[56] References Cited

U.S. PATENT DOCUMENTS

| | | | |
|---|---|---|---|
| 4,009,334 | 2/1977 | Sypula | 364/574 |
| 4,112,499 | 9/1978 | Mangum, Jr. et al. | 364/574 |
| 4,684,976 | 8/1987 | Sugihara et al. | 358/167 |
| 4,700,229 | 10/1987 | Herrmann et al. | 358/167 |
| 4,748,499 | 5/1988 | Ueda | 358/167 |
| 4,750,037 | 6/1988 | Kido et al. | 358/167 |
| 4,792,855 | 12/1988 | Yoshida | 358/167 |
| 4,807,034 | 2/1989 | Takeuchi et al. | 358/167 |

Primary Examiner—Parshotam S. Lall
Assistant Examiner—Brian M. Mattson
Attorney, Agent, or Firm—Antonelli, Terry, Stout & Kraus

[57] ABSTRACT

A digital noise reducer includes an addition circuit for adding a digital input video signal supplied at one input thereof and a signal supplied at the other input thereof and for outputting a resultant sum signal, a delay circuit for delaying the output signal of the addition circuit by an input unit period of the digital input video signal, a subtraction circuit supplied with the digital input video signal and an output signal of the delay circuit, the subtraction circuit forming and outputting a difference component signal for the digital input video signal and the output signal of the delay circuit, and a characteristic adjustment circuit for manipulating a signal characteristic of the difference component output of the subtraction circuit in accordance with the characteristic of the difference component signal outputted from the subtraction circuit and/or a characteristic of a digital output video signal outputted from the addition circuit and for outputting a resultant manipulated signal to the other input of the addition circuit.

16 Claims, 12 Drawing Sheets

DIGITAL NOISE REDUCER

BACKGROUND OF THE INVENTION

The present invention relates to a digital noise reducer suitable to use in a video tape recorder or the like.

As apparatuses for reducing noises of picture signals, so-called noise reducers using correlation (1) between lines, (2) between fields, (3) between frames, or the like in picture signals are often used. Owing to the advancement of semiconductor techniques in recent years as well as development of high-speed A-D (analog-digital) converters, D-A (digital-analog) converters and memories applicable to picture signal processing as well, realization of noise reducers using digital techniques has also become possible. In particular, field delays and frame delays have become possible by using memories as delay circuits. Noise reducers using the field correlation or frame correlation which have heretofore been impossible with analog circuits can thus be put into practical use.

These noise reducers using digital techniques are discussed in "Gazo no digital shingo shori (Digital signal processing of pictures)" written by Fukinuke and published by Nikkan Kogyo Shinbunsha, pp. 115 to 118. An example thereof will now be described by referring to FIG. 1. In FIG. 1, numeral 1 denotes an addition circuit, 2 a subtraction circuit, 3 a coefficient multiplication circuit, 4 an input terminal, 5 a delay circuit, and 6 an output terminal. Processing is performed by means of digital means, and the delay circuit 5 comprises a memory and its control circuit.

Assuming now that a signal (digital datum) input to the input terminal 4 at time $t_1$ is $X_i$, the input signal $X_i$ is supplied to the addition circuit 1 and the subtraction circuit 2. Concurrently therewith, a signal $Y_i$ is supplied from the delay circuit 5 to the subtraction circuit 2. In the subtraction circuit 2, the input signal $X_i$ is subtracted from the signal $Y_i$ supplied from the delay circuit 5. The resultant difference component $(Y_i - X_i)$ is supplied to the coefficient multiplication circuit 3. In the coefficient multiplication circuit 3, the difference component $(Y_i - X_i)$ thus supplied is multiplied by K ($0 \leq K < 1$). The resultant $K(Y_i - X_i)$ is supplied to the addition circuit 1. In the addition circuit 1, the input signal $X_i$ supplied from the input terminal 4 and the difference component $K(Y_i - X_i)$ supplied from the coefficient multiplication circuit 3 are added together to form a signal $Z_i$. This signal is output from the output terminal 6 and supplied to the delay circuit 5. In the delay circuit 5, the supplied signal $Z_i$ is delayed by a predetermined time, (such as one field interval in an apparatus using field correlation, for example) and supplied to the subtraction circuit 2. The addition circuit 1, subtraction circuit 2, coefficient multiplication circuit 3 and delay circuit 5 constitute a so-called noise reducer of feedback type.

This noise reducer of feedback type has transfer function H(Z) represented by equation (1) as:

$$H(Z) = \frac{1-K}{1-KZ^{-1}} \quad (1)$$

wherein $Z^{-1}$ is a unit delay operator and is related to a delay time T of the delay circuit 5 as:

$$Z^{-1} = e^{-jwT}. \quad (2)$$

The noise reducer of feedback type having the transfer function H(Z) of the equation (1), where the unit delay operator $Z^{-1}$ is represented by the equation (2), exhibits comb-shaped frequency response, which assumes peaks at frequencies n/T (where n=0, 1, 2, ...) and which assumes bottoms at frequencies (2n+1)/2T as shown in FIG. 2. Assuming that T is a field period or a frame period and the input signal input from the input terminal 4 of FIG. 1 is a video signal, its spectrum distribution coincides with the peaks of FIG. 2. Therefore, noise components in the video signal which coincide with the bottom portions are reduced.

That is to say, by making the delay time T of the delay circuit 5 equal to one line interval, one field interval or one frame interval, the frequency spectra of the picture signal coincide with peaks of FIG. because of the correlation property of the picture signal. Noise components having no correlation coincide with the bottom portions. Accordingly, the picture signal input from the input terminal 1 is obtained at the output terminal 6 without attenuation, whereas noises located at bottom portions are reduced. As a result, the S/N ratio is improved.

The depth of bottom portions of the comb-shaped frequency response shown in FIG. 2 depends upon the feedback coefficient K. When the feedback coefficient K is small, the bottom portions are shallow as indicated by broken lines. When the feedback coefficient K is large, the bottom portions become less shallow as indicated by solid lines. The larger the feedback coefficient K becomes, therefore, the larger the noise reducing effect becomes.

On the other hand, the signal $Z_i$ obtained at the output terminal 6 of FIG. 1 can also be represented as:

$$\begin{aligned} Z_i &= X_i + K(Y_i - X_i) \\ &= (1-K)X_i + KY_i \end{aligned} \quad (3)$$

where the signal $Y_i$ is an output signal obtained before the input signal $X_i$ by the delay time of the delay circuit 5. Assuming now that there is difference $\Delta X_i$ between the input signal $X_i$ and the output signal $Y_i$, the input signal can be represented as $X_i = Y_i + \Delta X_i$. By substituting this equation into the equation (3), we get:

$$Z_i = (1-K)\Delta X_i + Y_i. \quad (4)$$

As the feedback coefficient K is made large in a noise reducer of feedback type, the amount of noise reduction becomes larger as described above. When the feedback coefficient K (where $0 \leq K < 1$) is large, however, it is evident from the equation (4) that $(1-K)\Delta X_i$ becomes small, and the difference component $\Delta X_i$ satisfying the relation:

$$|(1-K)\Delta X_i| < 1 \text{ LSB} \quad (5)$$

(where 1 LSB is a digital value representing one gradation of quantization) is discarded in the process of rounding operation, and the output signal does not change in some cases. That is to say, an increase in feedback coefficient K causes increased degradation errors in a region where the video signal does not change often, resulting in deteriorated picture quality as if the number of quantization bits is substantially reduced.

In a line noise reducer using vertical correlation, for example, deterioration of vertical resolution (vertical blur) is caused at contour portions of the picture. In a frame noise reducer using frame correlation, deterioration (lag) of dynamic resolution depending upon a difference in picture contents between frames of a moving picture is caused. Further in a field noise reducer using field correlation, deterioration of vertical resolution and dynamic resolution is caused because the field noise reducer has intermediate characteristics between those of the line noise reducer and the frame noise reducer.

SUMMARY OF THE INVENTION

An object of the present invention is to provide a noise reducer which is free from the above described problems, which is capable of reducing the above described deterioration of resolution, and which is capable of reducing noises efficiently.

In accordance with one aspect of the present invention, a characteristic adjustment circuit is disposed instead of the coefficient multiplication circuit used in a noise reducer of feedback type in order to achieve the above described object. And, the characteristic adjustment circuit includes low level detection means for detecting a low level region where the absolute value $|Xi-Yi|$ of the difference component between the input signal Xi and the signal Yi supplied from the delay circuit does not exceed a certain value, and a variable coefficient multiplication circuit in which a small value of feedback coefficient K is set by the detection output of the detection means.

When the prior art is used, the difference component is removed as the noise component in the low level region in accordance with the above described equation (4). In accordance with the above described aspect of the present invention, however, signal components are considered to be contained in the difference component, and the feedback coefficient K is made small so that the difference component may be supplied to the addition circuit via the coefficient multiplication circuit. Accordingly, the difference component is not removed, and the output signal contains gradation equivalent to that of the input signal, resulting in improved picture quality.

Further, in accordance with another aspect of the present invention, a characteristic adjustment circuit is disposed instead of the coefficient multiplication circuit used in the noise reducer of feedback type. And, the characteristic adjustment circuit includes a variable coefficient multiplication circuit for changing the feedback coefficient K, a limiter circuit disposed between the variable coefficient multiplication circuit and a subtraction circuit for generating the difference component between the input signal and the output signal of the delay circuit and provided with such input-output characteristics that the output level is decreased when the absolute value of the level of the above described difference component is not lower than a predetermined level, and a control circuit for controlling the limiter circuit so as to change the input-output characteristics in accordance with the feedback coefficient set in the variable coefficient multiplication circuit by a user.

When the signal-to-noise ratio of a picture signal is low, the feedback coefficient K in a noise reducer is in general made large to set the amount of feedback at a large value because the signal-to-noise ratio must be largely improved. When the signal-to-noise ratio of the picture signal is comparatively good, the feedback coefficient K is made small to set the amount of feedback at a low value because the signal-to-noise ratio need not be improved so largely. Therefore, the signal-to-noise ratio of the picture signal and the amount of feedback of the noise reducer have mutual correlation to some degree.

On the other hand, when the level of the absolute value of the difference signal supplied from the above described computing circuit is large in the noise reducer, this difference signal is regarded as the difference component of the picture signal. When the level of the absolute value is low, the difference signal is regarded as a noise component. When the level of the absolute value of the difference signal is not lower than a fixed level, the above described limiter circuit limits the level of the absolute value to reduce the feedback. In a portion where the picture signal Largely changes and correlation is absent, therefore, processing is not performed and the resolution is not deteriorated. For a signal having a level not higher than the limiter level, however, the resolution is still caused. In the viewpoint of preventing resolution deterioration, therefore, it is desirable to set the limiter level at a low value as far as possible. On the other hand, the effect of improving the signal-to-noise ratio is decreased if the limiter level is made lower than the noise level. Therefore, it is necessary to set the limiter level at a value higher than the noise level in accordance with the noise level.

The latter described aspect of the present invention is based upon the viewpoint heretofore described. The feedback coefficient of the coefficient multiplication circuit and the input-output characteristics of the limiter circuit are made variable. And, following steps are taken on the basis of the correlative relation between the signal-to-noise ratio of the picture and the amount of feedback. For a picture signal having a low signal-to-noise ratio, the feedback coefficient of the coefficient multiplication circuit is made large to increase the amount of feedback, and the input-output characteristics of the limiter circuit is so set as to raise the limiter level, thereby the signal-to-noise ratio being improved efficiently. For a picture signal having a high signal-to-noise ratio, the feedback coefficient of the coefficient multiplication circuit is made small to reduce the amount of feedback, and the input-output characteristics of the limiter circuit is so set as to lower the limiter level, thereby deterioration of resolution being suppressed to the utmost.

In accordance with a further aspect of the present invention, a characteristic adjustment circuit is provided instead of the coefficient multiplication circuit used in the noise reducer of feedback type. And, the characteristic adjustment circuit includes a variable coefficient multiplication circuit for changing the feedback coefficient K, a limiter circuit disposed between the variable coefficient multiplication circuit and the subtraction circuit and provided with such input-output characteristics that the output level is decreased when the absolute value of the level of the difference component is not lower than a fixed level, a control circuit for controlling the limiter circuit so as to change the input-output characteristics of the limiter circuit on the basis of a feedback coefficient set into the variable coefficient multiplication circuit by a user, and low level detection means for adjusting the coefficient of the above described variable coefficient multiplication circuit so as to make it small when the low level detection means detects a low level region where the absolute value $|Xi-Yi|$ of the difference component between the input signal Xi and the signal Yi supplied from the delay circuit does not exceed a certain value.

DESCRIPTION OF THE PREFERRED EMBODIMENTS

Figure 3:
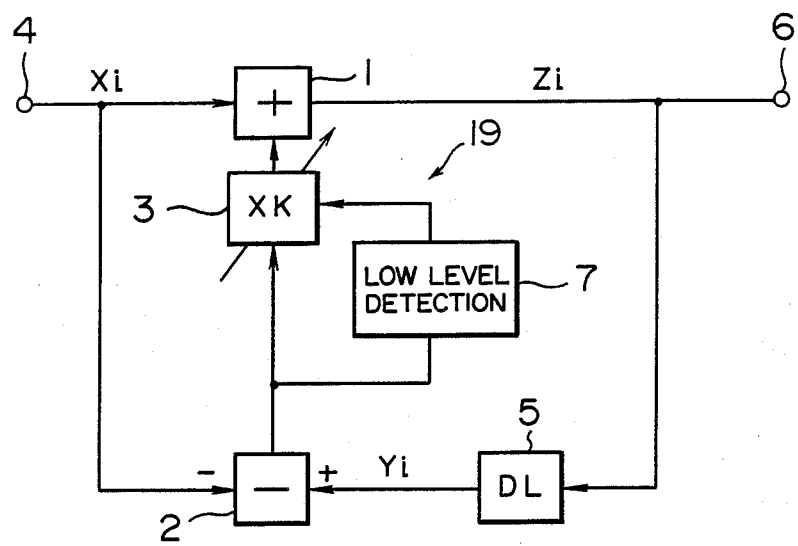
FIG. 3 is a block diagram showing an embodiment of a digital noise reducer according to the present invention.

The present invention will now be described by referring to illustrated embodiments. FIG. 3 is a block diagram showing an embodiment of a digital noise reducer according to the present invention. Numeral 1 denotes an addition circuit, 2 a subtraction circuit, 4 an input terminal, 5 a delay circuit, 6 an output terminal, 19 a characteristic adjustment circuit comprising a variable coefficient multiplication circuit 3 and a low level detection circuit 7.

In FIG. 3, a video signal quantized into m bits (where typically m=6 to 8) is input from the input terminal 4. Assuming that a datum (hereafter referred to as signal) of the video signal at time $t_i$ is Xi, the signal Xi is supplied to the addition circuit 1 and the subtraction circuit 2. In the subtraction circuit 2, the input signal Xi is subtracted from a signal Yi comprising m bits supplied from the delay circuit 5 to produce a difference component (Yi−Xi) comprising (m+1) bits. The difference component (Yi−Xi) is supplied to the variable coefficient multiplication circuit 3 and the low level detection circuit 7. The low level detection circuit 7 detects the level (value) of the supplied difference component (Yi−Xi) and controls the variable coefficient multiplication circuit 3 to set a feedback coefficient K on the basis of the detected level. The output of the variable coefficient multiplication circuit 3 is supplied to the other input of the addition circuit 1.

Assuming now that the feedback coefficient K set in the variable coefficient multiplication circuit 3 is chosen to be an optimum value $K_o$ in normal operation in order to achieve a sufficient noise reduction effect, a region of values of the difference component ΔXi satisfying the above described equation (5) with respect to the feedback coefficient $K_o$, i.e. satisfying the relation:

$$|(1-K_o).\Delta Xi|<1, \qquad (6)$$

is referred to as low level region. In this low level region, $$|(1-K_o).\Delta Xi|$$

becomes smaller than one gradation of quantization, where the difference component ΔXi is represented as:

$$\Delta Xi = Xi - Yi = -(Yi-Xi).$$

As one example, the feedback coefficient K is so set as to satisfy the following conditions in accordance with the value of the difference component ΔXi.

(i) When $|\Delta Xi| \geq 1/(1 - K_o)$, $K = K_o$ (ii) When $1 \leq |\Delta Xi| < 1/(1 - K_o)$, $|Zi - Yi| = |(1 - K) \cdot \Delta Xi| = 1$ The case (i) corresponds to a region other than the low level region, whereas the case (ii) corresponds to the low level region. In case of (ii), the value of the feedback coefficient K is changed in accordance with the value of the difference component Xi, and (1−K).ΔXi corresponding to the equation (6) among the output signal Zi represented by the equation (4) is always defined to be unity.

In the prior art, the difference component $\Delta Xi$ satisfying the relation $|\Delta Xi|<1/1-K_o$ is in some cases discarded as a result of a rounding operation of the fixed point part. Even if the level of the input signal changes, therefore, the level of the output signal does not track it in some cases. Owing to the setting of the above described (ii) in the low level region, however, the difference component in the low level region is regarded as a signal component. Even for a change in input level corresponding to one gradation of quantization, therefore, the output signal tracks the input signal.

If in (i), $$|\Delta Xi| = \frac{1}{1-K_o}\lambda.$$

It follows that $(1-K_o)\cdot|\Delta Xi|=1$. Since in this case, as well, $(1-K)\Delta Xi$ of the output signal Zi represented by the equation (4) becomes unity, the cases (i) and (ii) are jointed continuously.

In the variable coefficient multiplication circuit 3, the supplied difference component (Yi−Xi) is increased by K times and rounded into a datum comprising (m+1) bits (for example, it is rounded up at place $2^{-1}$). The resultant datum is supplied to the addition circuit 1. In the addition circuit 1, this signal K(Yi−Xi) is added to the input signal Xi. The resultant signal Zi comprising m bits is output and supplied to the delay circuit 5 again.

Figure 4:
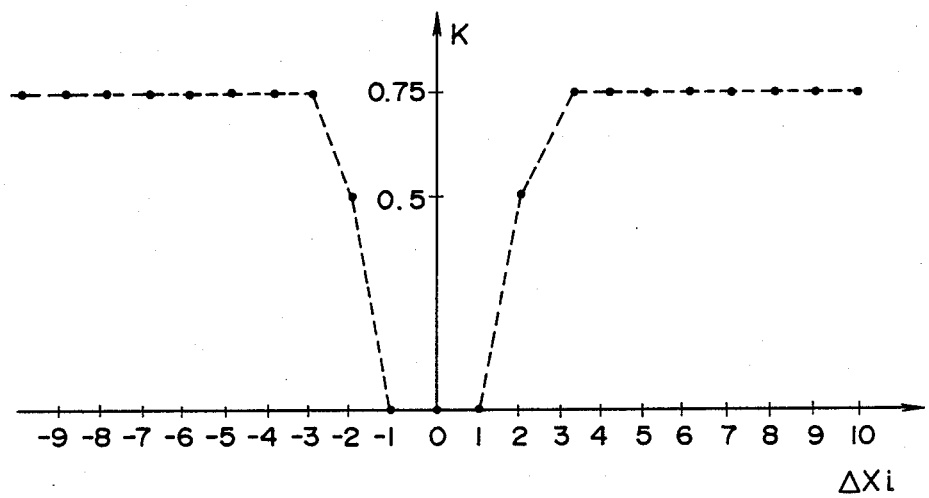
FIG. 4 is a characteristic diagram showing a concrete example of a feedback coefficient corresponding to the difference component of the variable coefficient multiplication circuit shown in FIG. 3.

FIG. 4 shows a relationship between the difference component $\Delta Xi$ and the feedback coefficient K obtained when $K_o=0.75$. The feedback coefficient K is rounded up at place $2^{-3}$ to simplify the control of the variable coefficient multiplication circuit 3. When $|\Delta Xi|=3$, therefore, K becomes $\frac{5}{8}$, i.e., $2^{-1}+2^{-3}+\ldots$ on the basis of the above described condition (ii). However, K is rounded up at the place $2^{-3}$ to be set at $2^{-1}+2^{-2}$, i.e. 0.75. Even if K is thus set, the tracking of the output signal level to the input signal level does not pose a problem as described later. Waveforms of the input signal Xi and the output signal Yi at this time are shown in FIGS. 5A, 5B and 5C.

Figure 5A:
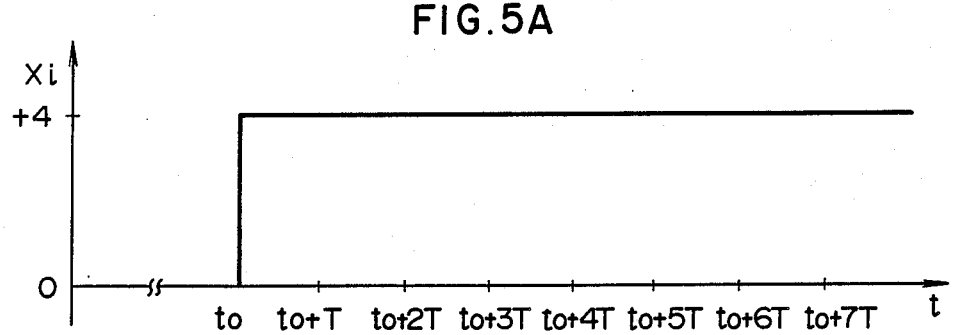
FIGS. 5A, 5B and 5C are waveform diagrams showing the input signal and the output signal of the embodiment of FIG. 3 for the characteristic illustrated in FIG. 4 as well as the input signal and the output signal of the digital noise reducer of the prior art.
Figure 5B:
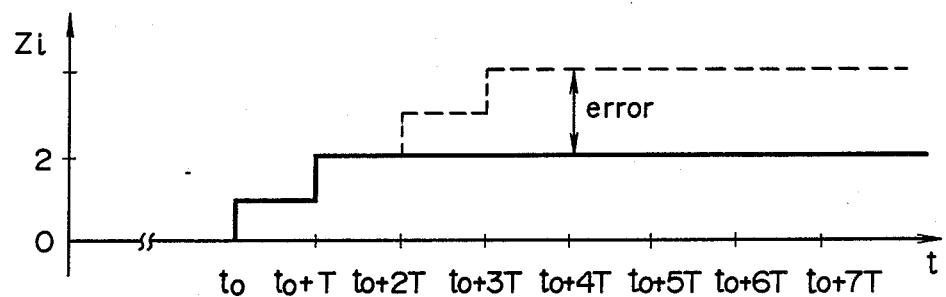
Figure 5C:
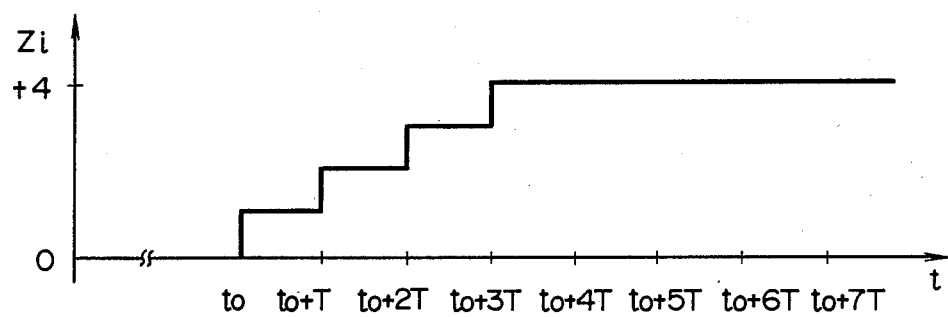

It is now assumed that the input signal Xi changes from 0 LSB to 4 LSB at time $t_o$ and thereafter assumes a constant value of 4 as shown in FIG. 5A. The output signal Zi of the digital noise reducer of the prior art (FIG. 1) having a feedback coefficient K of 0.75 obtained when the above described input signal Xi is applied thereto will now be described.

Since Yi=0 and $\Delta Xi=-4$ at time $t_o$, it follows that:

$$K\cdot\Delta Xi=-3, Zi=4+(-3)=1.$$

Since Yi=1 and $\Delta Xi=-3$ at next time $t_0+T$ (where T is delay time of the delay circuit 5), it follows that:

$$K\cdot\Delta Xi=-2, Zi=4+(-2)=2$$

where $K\cdot\Delta Xi$ is rounded up at the place of $2^{-1}$. Since Yi=2 and $\Delta Xi=-2$ at next time $t_o+2T$, it follows that:

$$K\cdot\Delta Xi=-2, Zi=4+(-2)=2.$$

Thereafter, Yi=2 at all times and Zi=2. Therefore, the output signal Zi has a waveform represented by a solid line of FIG. 5B.

The output signal Zi of FIG. 3 in which the feedback coefficient K is controlled will now be described assuming that the feedback coefficient K is controlled with respect to the difference component $\Delta Xi$ a shown in FIG. 4.

Since Yi=0 and $\Delta Xi=-4$ at time $t_o$, it follows that $K=K_o=0.75$, and hence:

$$K\cdot\Delta Xi=-3, Zi=4+(-3)=1.$$

Since Yi=1 and $\Delta Xi=-3$ at next time $t_o+T$, K is set as K=0.75 as explained before by referring to FIG. 4, and it follows that:

$$K\cdot\Delta Xi=-2, Zi=4+(-2)=2.$$

Since Yi=2 and Xi=−2 at next time $t_o+2T$, K is set as K=0.5, and it follows that:

$$K\cdot\Delta Xi=-1, Zi=4+(-1)=3.$$

At next time $t_o+2T$, Yi=3 and $\Delta Xi=-1$. Since K is set as:

$$K=0,$$

we obtain:

$$K\cdot\Delta Xi=0, Zi=4+0=4.$$

Since Yi=4 and $\Delta Xi=0$ thereafter, the relations represented as:

$$K\cdot\Delta Xi=0, Zi=4$$

continue. From the foregoing description, the output signal Zi changes as shown in FIG. 5C. As the level of the input signal changes, the level of the output signal changes one LSB by one LSB until it becomes equal to the level of the input signal.

It is evident from the comparison of FIG. 5B with FIG. 5C that in case of the prior art illustrated in FIG. 5B, a portion represented by broken lines in FIG. 5B (corresponding to two gradations of quantization) is lost as compared with the embodiment illustrated in FIG. 5C. In this portion, the difference component $\Delta Xi$ is small. Accordingly, four gradations are reduced to two gradations, the number of quatization bits being substantially reduced. On the other hand, gradations of the input signal can be faithfully obtained and the picture quality is improved in case of the present embodiment.

Figure 6:
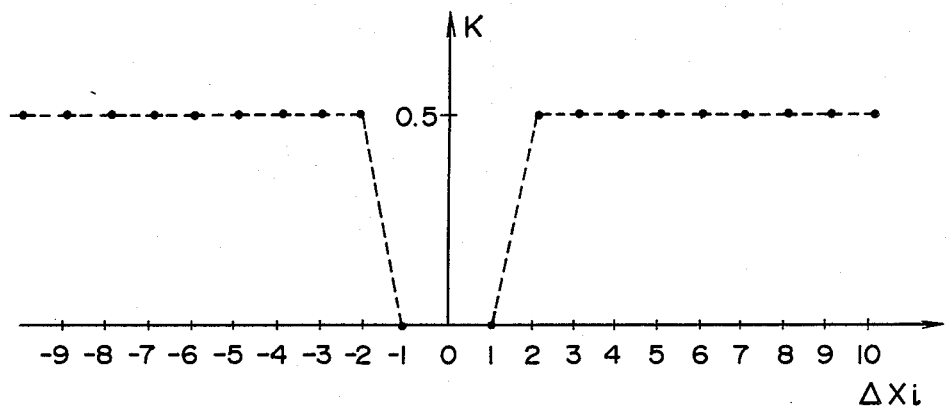
FIG. 6 is a characteristic diagram showing another concrete example of the relationship between the difference component of the variable coefficient multiplication circuit illustrated in FIG. 3 and the feedback coefficient.
Figure 7A:
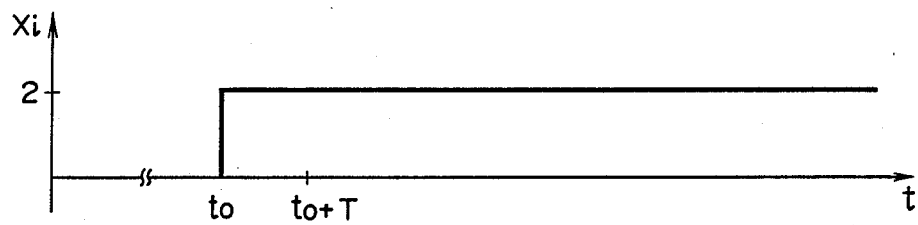
FIGS. 7A, 7B and 7C are waveform diagrams showing the input signal and the output signal of the embodiment of FIG. 3 for the characteristic illustrated in FIG. 6 as well as the input signal and the output signal of the digital noise reducer of the prior art.
Figure 7B:
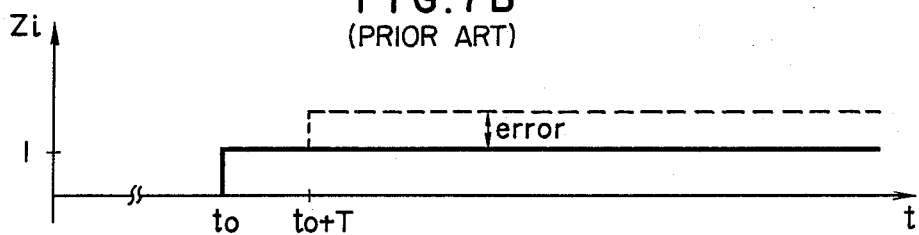
Figure 7C:
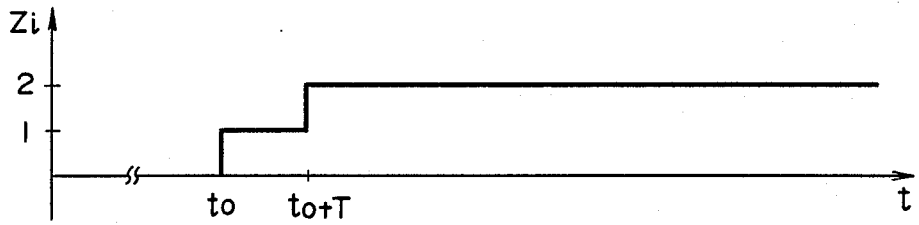

FIG. 6 shows the relation between the difference component $\Delta Xi$ and the feedback coefficient K obtained when the relation $K_o=0.5$ is prescribed on the basis of desired improvement of the signal-to-noise ratio of the input signal Xi. When an input signal Xi as shown in FIG. 7A is applied, the output signal Zi, as represented by solid lines in FIG. 7B, is obtained in the digital noise reducer of the prior art having a feedback coefficient K which is always constant and 0.5. In the embodiment shown in FIG. 3, the output signal Zi as shown in FIG. 7C is obtained. The output signal Zi becomes equal to the input signal Xi since time $(t_o+T)$ in case of FIG. 7C, whereas the output signal Zi becomes smaller than the input signal Xi in case of FIG. 7B.

In the embodiment shown in FIG. 3, the gradation of the output signal becomes equal to that of the input signal as described above. Therefore, the number of quantization bits is not substantially reduced, and the quality of the reproduced picture is improved.

Figure 8:
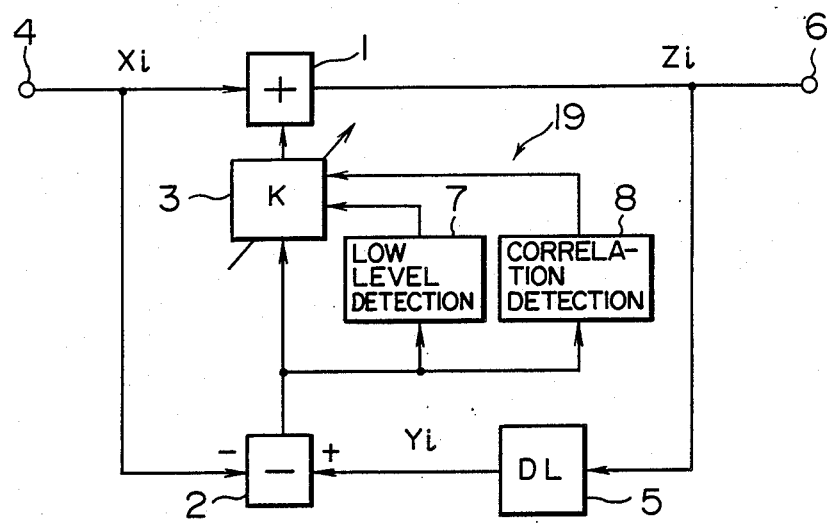
FIG. 8 is a block diagram showing another embodiment of a digital noise reducer according to the present invention.
Figure 9:
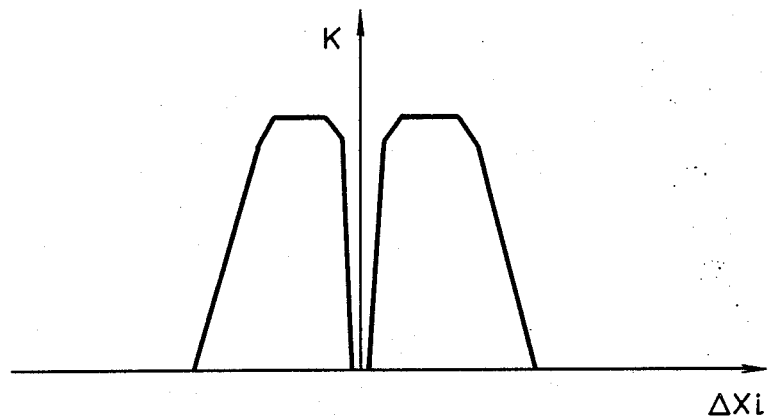
FIG. 9 is a characteristic diagram showing another concrete example of the feedback coefficient of the variable coefficient multiplication circuit illustrated in FIG. 8 with respect to the difference component.

FIG. 8 is a block diagram showing another embodiment of the digital noise reducer according to the present invention. In this embodiment, a characteristic adjustment circuit 19 comprises a variable coefficient multiplication circuit 3, a low level detection circuit 7 and a correlation detection circuit 8.

Portions corresponding to those of FIG. 3 are denoted by identical symbols and will not be described repeatedly.

In the embodiment shown in FIG. 3, the feedback coefficient K is $K_o$ and constant when $|\Delta Xi| > 1/(1-K_o)$ as shown in FIGS. 4 and 6. In field noise reducers and frame noise reducers among noise reducers of feedback type, however, input signals are averaged over a large number of fields or frames to reduce noises. When the feedback coefficient K is large and the difference component $\Delta Xi$ between fields or frames is large and the correlation is low because of abrupt change of the picture as in the picture contour, therefore, this abrupt change portion of the picture appears over a large number of fields or frames, resulting in a lag. Further, in line noise reducers, input signals are averaged over a large number of horizontal scanning intervals (lines) to reduce noises. If in this case, as well, the feedback coefficient K is large and the correlation between lines is low because of difference in signal level between adjacent horizontal scanning lines, signals are averaged over these horizontal scanning lines resulting in lowered vertical resolution. If the feedback coefficient K is large, the averaging effect similar to noises is thus increased at portions where the signal level largely changes, resulting in lag or deterioration of vertical resolution.

When the signal level largely changes and the difference component $|\Delta Xi|$ is large in the embodiment of FIG. 8, the difference component is considered to be caused by the level difference of preceding and succeeding signal components themselves, and the feedback coefficient K is made small so that the level of the output signal may track the level of the input signal to prevent occurrence of lag and deterioration of vertical resolution. For this purpose, the correlation detection circuit 8 is provided, and when the absolute value of the difference component output from the subtraction circuit 2 becomes equal to or larger than a certain value and correlation becomes low, it is detected, and the feedback coefficient K is made smaller.

Figure 10:
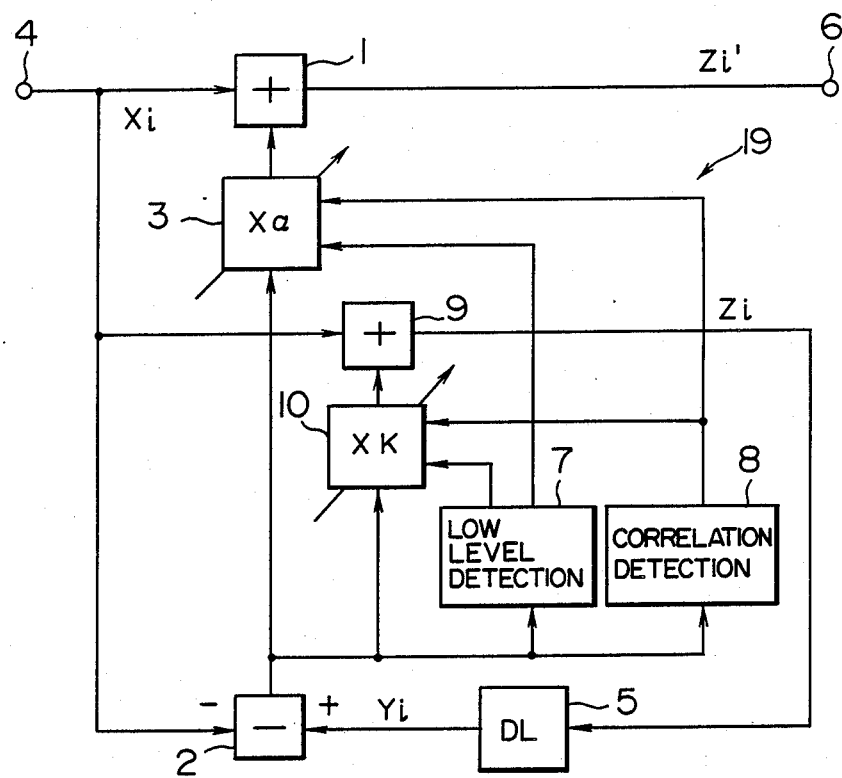
FIG. 10 is a block diagram showing a further embodiment of a digital noise reducer according to the present invention.

FIG. 10 shows a further embodiment of the digital noise reducer according to the present invention. The configuration of this embodiment differs from that of the embodiment shown in FIG. 8 in that the characteristic adjustment circuit 19 comprises a first addition circuit 1, a second addition circuit 9, a first variable coefficient multiplication circuit 3 and a second variable coefficient multiplication circuit 10. Portions corresponding to those of drawings described before are denoted by identical symbols.

In this embodiment, the output signal Zi and the signal Yi delayed in the delay circuit 5 are derived in different first and second computing circuits 1 and 9, respectively.

In the subtraction circuit 2 of FIG. 10, a difference signal $\Delta Xi$ ($=Yi-Xi$) between the input signal Xi and the signal Yi supplied from the delay circuit 5 is obtained. On the one hand, the difference signal $\Delta Xi$ is increased by K times in the second variable coefficient multiplication circuit 10 and then added to the input signal Xi in the second addition circuit 9. The resultant signal Zi is supplied to the delay circuit 5. On the other hand, the difference signal $\Delta Xi$ is increased by $\alpha$ times (where $0 \leq \alpha < 1$) in the first variable coefficient multiplication circuit 3 and then added to the input signal Xi in the first addition circuit 1 to form the output signal Zi'.

This embodiment also has a comb-shaped characteristic and exhibits a noise reducing effect. The output signal Zi' obtained at the output terminal 6 and the signal Zi output from the second addition circuit 9 are represented as:

$$Zi' = (1-\alpha) \cdot \Delta Xi + Yi,$$

$$Zi = (1-K) \cdot \Delta Xi + Yi.$$

Figure 11:
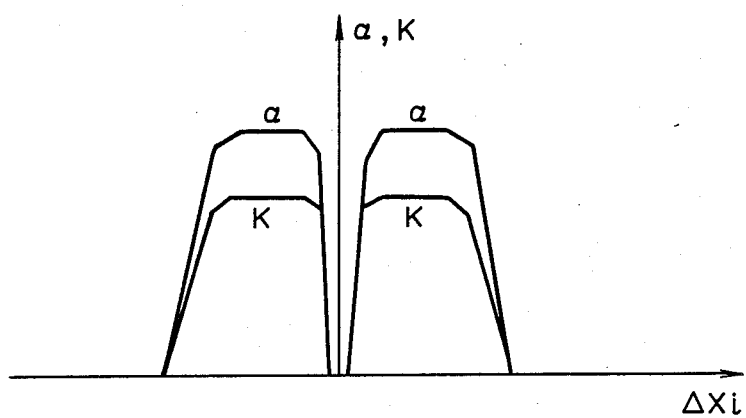
FIG. 11 is a characteristic diagram showing feedback coefficients for respective difference components of the variable coefficient multiplication circuit.

In the same way as the embodiment of FIG. 8, the feedback coefficient K of the second variable coefficient multiplication circuit 10 and the feedback coefficient $\alpha$ of the first variable coefficient multiplication circuit 3 are respectively controlled by outputs detected by the low level detection circuit 7 and the correlation detection circuit 8 as shown in FIG. 11. In general, $\alpha \neq K$. By changing the relation between the feedback coefficient $\alpha$ and the feedback coefficient K, an arbitrary comb characteristic can be chosen. When $\alpha = K + \frac{1}{2}$, the characteristic of the comb filter has zero points at bottoms shown in FIG. 2.

In FIG. 3 as well, the signal output from the output terminal 6 and the signal delayed in the delay circuit 5 may be derived by different respective computing circuits in the same way as the embodiment of FIG. 10. It is a matter of course that the present invention can be applied to a digital noise reducer of feedback type having basically identical characteristics and different configuration.

In the same way as the embodiment of FIG. 3, in the embodiments of FIGS. 8 and 10 as well, the feedback coefficient K is so set as to satisfy the relations:

(i) $K = K_o$ when $|\Delta Xi| \geq 1/(1 - K_o)$, and (ii) $|Zi - Yi| = |(I - K) \cdot \Delta Xi| = 1$ when $l \leq |\Delta Xi| < 1/(1 - K_o)$.

Embodiments in accordance with a different aspect of the present invention will now be described by referring to FIGS. 12 to 19.

Figure 12:
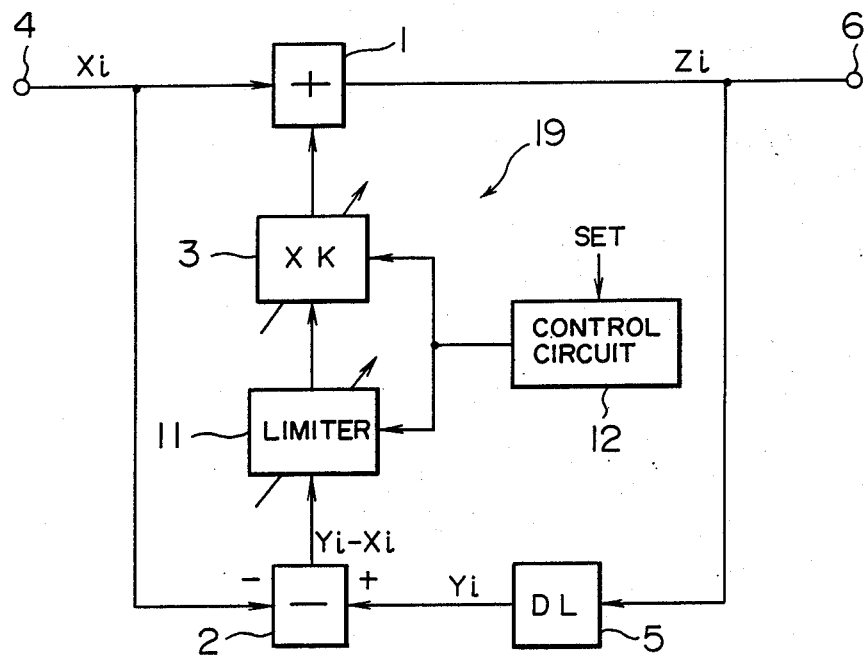
FIG. 12 is a block diagram showing an embodiment of a noise reducer according to the present invention.

An embodiment shown in FIG. 12 has a feature that in the block configuration of the embodiments heretofore described the characteristic adjustment circuit 19 comprises a limiter circuit 11 and a variable coefficient multiplication circuit 3, which are connected in series between the subtraction circuit 2 and the variable coefficient multiplication circuit 3, as well as a control circuit 12 for controlling the circuits 11 and 3.

In FIG. 12, a picture signal (such as a luminance signal) is input from an input terminal 4 and supplied to the addition circuit 1 and the subtraction circuit 2. It is now assumed that this input picture signal at time $t_i$ is Xi, the output signal of the delay circuit 5 at this time is Yi, and the output signal of the addition circuit 1 is Zi. The output signal Yi of the delay circuit 5 is supplied to the subtraction circuit 2 to generate a difference signal (Yi$-$Xi) representing the difference between the output signal Yi and the input picture signal Xi. This difference signal (Yi$-$Xi) is supplied to the limiter circuit 11.

The limiter circuit 11 is controlled by the control circuit 12 together with the variable coefficient multiplication circuit 3. When the feedback coefficient K is set in the variable coefficient multiplication circuit 3 as a result of the control, the input-output characteristic suitable to the feedback coefficient K thus set is set into the limiter circuit 11.

The operation of the control circuit 12 is externally set by a user. On the basis of this setting, the control circuit 12 controls the limiter 11 and the variable coefficient multiplication circuit 3.

The difference signal (Yi−Xi) is processed in the limiter circuit 11. Assuming that the function representing the input-output characteristics of the limiter circuit 11 is $\alpha$, the output signal of the limiter circuit 11 becomes $\alpha \cdot (Yi-Xi)$. This output signal $\alpha \cdot (Yi-Xi)$ is supplied to the variable coefficient multiplication circuit 3. The function $\alpha$ is a function of the difference signal (Yi−Xi). In the variable coefficient multiplication circuit 3, the feedback coefficient K set by the control circuit 12 is multiplied by the supplied signal $\alpha \cdot (Yi-Xi)$. The resultant signal $K \cdot \alpha (Yi-Xi)$ is supplied to the addition circuit 1. In the addition circuit 1, the input picture signal Xi and the signal $K \cdot \alpha \cdot (Yi-Xi)$ are added together to output the signal Zi. This signal Zi is output from the output terminal 6 and delayed in the delay circuit 5 by a fixed time T (such as one line interval in a line noise reducer, one field interval in a field noise reducer, and one frame interval in a frame noise reducer) to be supplied to the subtraction circuit 2.

In the present embodiment, the signal Yi can be related to Zi as:

$$Yi = Zi e^{-jwT}. \tag{7}$$

As a result of the above described processing, we get:

$$Zi = Xi + K \cdot \alpha (Yi - Xi).$$

From this equation and the equation (7), the transfer function T of the present embodiment is represented as:

$$T = \frac{1 - K'}{1 - K' e^{-jwT}} \tag{8}$$

where $K' = K \cdot \alpha$.

Figure 1:
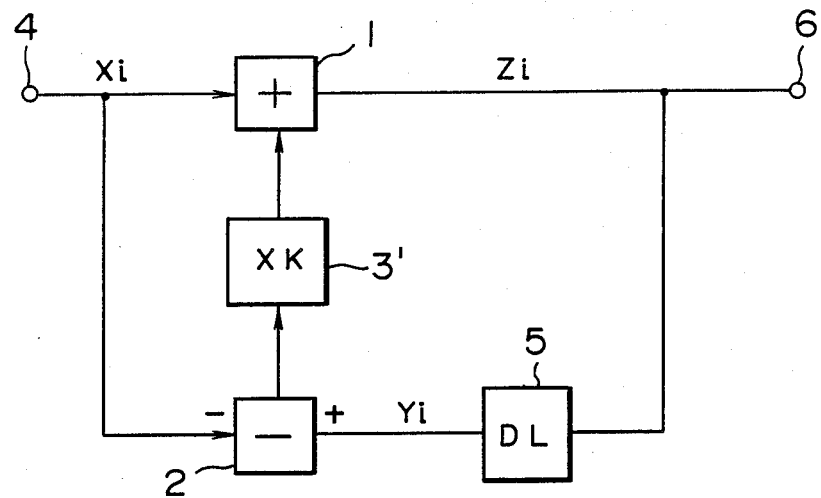
FIG. 1 is a block diagram showing an example of a digital noise reducer of the prior art.

The equation (8) is similar to the equation (1) representing the transfer function of the prior art apparatus shown in FIG. 1. The present embodiment thus has a comb-shaped frequency response similar to that of FIG. 2. The present embodiment differs from the above described prior art apparatus in the following two points:

(1) In the prior art apparatus, $\alpha$ is unity. In the present embodiment, however, $\alpha$ is a function of the difference signal (Yi−Xi).

(2) The function $\alpha$ depends upon the feedback coefficient K.

Figure 13:
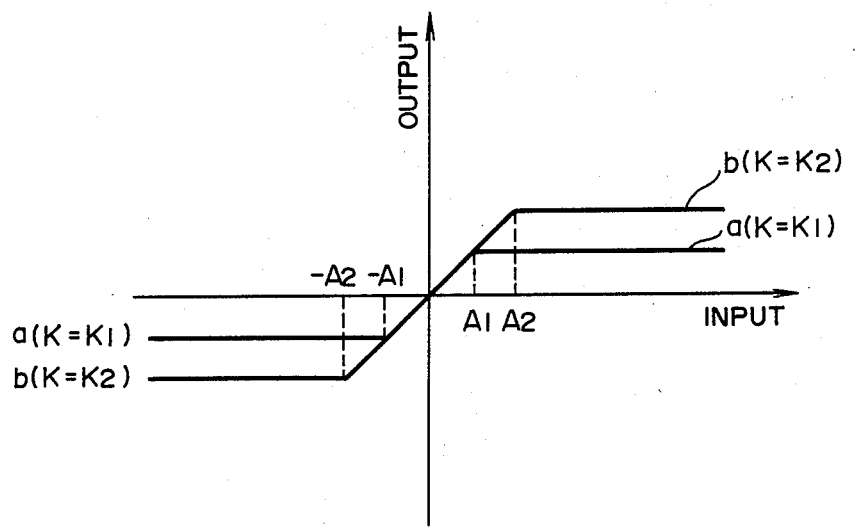
FIG. 13 shows an example of the input-output characteristic of the limiter circuit illustrated in FIG. 12.

It is now assumed that the feedback coefficient K set in the coefficient multiplication circuit 3 has two values of $K_1$ and $K_2$ and input-output characteristics of the limiter circuit 11 for these feedback coefficients $K = K_1$, $K_2$ (where $K_2 > K_1$) are represented by characteristics a and b shown in FIG. 13. Then, the function $\alpha$ for each case of $K = K_1$ and $K = K_2$ is represented as follows:

(i) When $K = K_1$, $\alpha = 1$ if $|Yi - Xi| < A_1$, $\alpha = A_1/|Yi - Xi|$ if $|Yi - Xi| \geq A_1$.

(ii) When $K = K_2$, $\alpha = 1$ if $|Yi - Xi| < A_2$, $\alpha = A_2/|Yi - Xi|$ if $|Yi - Xi| \geq A_2$.

Values $A_1$ and $A_2$ represent limiter levels of the limiter circuit 11 for respective cases of $K = K_1$ and $K = K_2$. The relation $A_2 > A_1$ holds true. From the equations (5) and (6), the essential feedback coefficient K' of the equation (4) becomes small in a portion including many changes (i.e. in a portion where $|Yi - Xi|$ is large). As a result, deterioration of resolution (such as vertical blur and lag) is reduced. When $K = K_1$, K' becomes smaller as compared with that obtained when $K = K_2$. Therefore, deterioration of resolution can further be suppressed.

When picture signals having low signal-to-noise ratios are input and a main object is to improve the signal-to-noise ratios, the user sets an improvement level into the control circuit. The control circuit 12 sets the feedback coefficient K of the variable coefficient multiplication circuit 3 at the larger value $K_2$. In response thereto, the control circuit 12 sets the input-output characteristic of the higher limiter level $A_2$ into the limiter circuit 11. Accordingly, the limiter circuit 11 sufficiently passes noise components, and the coefficient multiplication circuit 3 makes the amount of feedback sufficiently large. Therefore, the signal-to-noise ratio is sufficiently improved. In this case, deterioration of the vertical resolution and dynamic resolution of the picture signal is caused. Since the improvement effect of the signal-to-noise ratio is larger than the deterioration, however, the picture quality is largely improved.

In the case of a picture signal having a high signal-to-noise ratio, deterioration of vertical resolution and dynamic resolution rather than the improvement of the signal-to-noise ratio poses a problem. In such a case, the control circuit 12 sets the feedback coefficient K of the variable coefficient multiplication circuit 3 at the smaller value $K_1$ on the basis of the user's directive. In response thereto, the input-output characteristic of the lower limiter level $A_1$ is set into the limiter circuit 11. As a result, the limiter circuit 11 passes noise components of low level and sufficiently suppresses the difference signal of the picture signal. Further, the variable coefficient multiplication circuit 3 reduces the amount of feedback. Although the effect of improving the signal-to-noise ratio is not large, therefore, deterioration of vertical resolution and dynamic resolution can be prevented.

In this way, the feedback coefficient of the variable coefficient multiplication circuit 3 and the input-output characteristic of the limiter circuit 11 can be set on the basis of the degree of the signal-to-noise ratio possessed by the input picture signal, resulting in a picture of high picture quality.

Figure 14A:
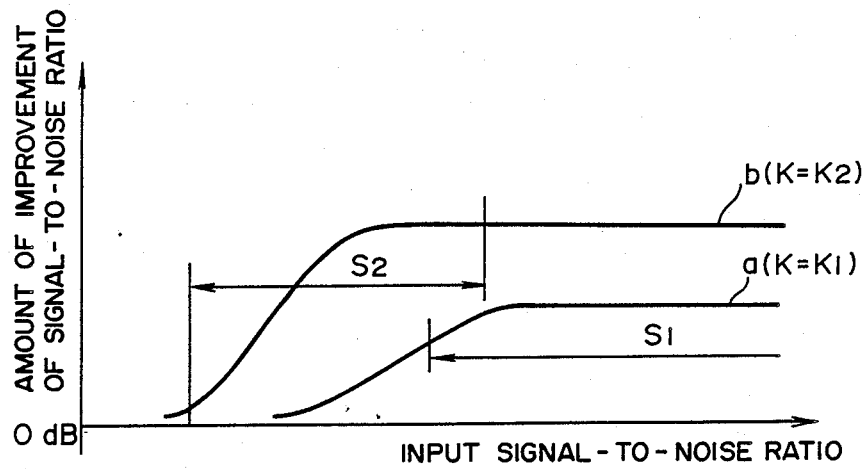
FIGS. 14A and 14B show examples of improved signal-to-noise ratio characteristics of the embodiment illustrated in FIG. 12.
Figure 14B:
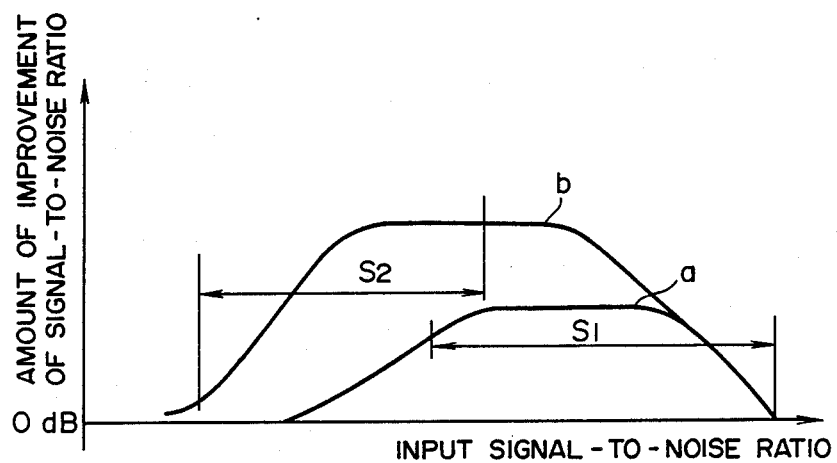

FIGS. 14A and 14B are characteristic diagrams showing the relation between the signal-to-noise ratio of an input picture signal (i.e. input signal-to-noise ratio) and the amount of improvement of the signal-to-noise ratio, which is obtained in the embodiment illustrated in FIG. 12. FIG. 14A shows a case of analog processing, and FIG. 14B shows a case of digital processing. Curves a represent cases where the feedback coefficient $K=K_2$, and curves b represent cases where the feedback coefficient $K=K_1$.

In FIG. 14A, the amount of improvement of the signal-to-noise ratio obtained when $K=K_2$ is larger than that obtained when $K=K_1$.

In a range where the signal-to-noise ratio of the input signal Xi is good and the difference signal $\Delta Xi$ does not reach the limiter level of the limiter circuit 11, a constant amount of improvement of the signal-to-noise ratio theoretically defined is obtained. In a range where the signal-to-noise ratio of the input signal Xi is lowered and the difference signal $\Delta Xi$ reaches the limiter level of the limiter circuit 11, the amount of feedback is lowered, and the amount of improvement of the signal-to-noise ratio is lowered.

The characteristic a is used in a region $S_2$ where the input signal-to-noise ratio is low, and the characteristic b is used in a region $S_1$ where the input signal-to-noise ratio is high.

In FIG. 14B as well, characteristics a and b are similar to those of FIG. 14A. Since the number of quantization bits of the picture signal is finite, however, the amount of improvement of signal-to-noise ratio is lowered in a region where the input signal-to-noise ratio is high because the highest signal-to-noise ratio is limited by the quantization noise. On the basis of a demanded value of signal-to-noise ratio, the number of quantization bits is defined. When the picture signal is a luminance signal, the typical number of quantization bits is approximately 8. 0815 (In analog processing as well, the highest signal-to-noise ratio is limited in some cases because of circuit configuration. In FIG. 14A, however, it was supposed that noise components were not generated at the highest signal-to-noise ratio.) In FIG. 14B, the characteristic a is used in the region $S_1$, and the characteristic b is used in the region $S_2$.

As a result, the limiter characteristic can always be optimized for a demanded amount of improvement of signal-to-noise ratio. Therefore, deterioration of resolution can be suppressed to the minimum.

In the present embodiment, it is thus possible to reduce noises of a picture signal while suppressing deterioration of the resolution to the utmost.

Figure 15:
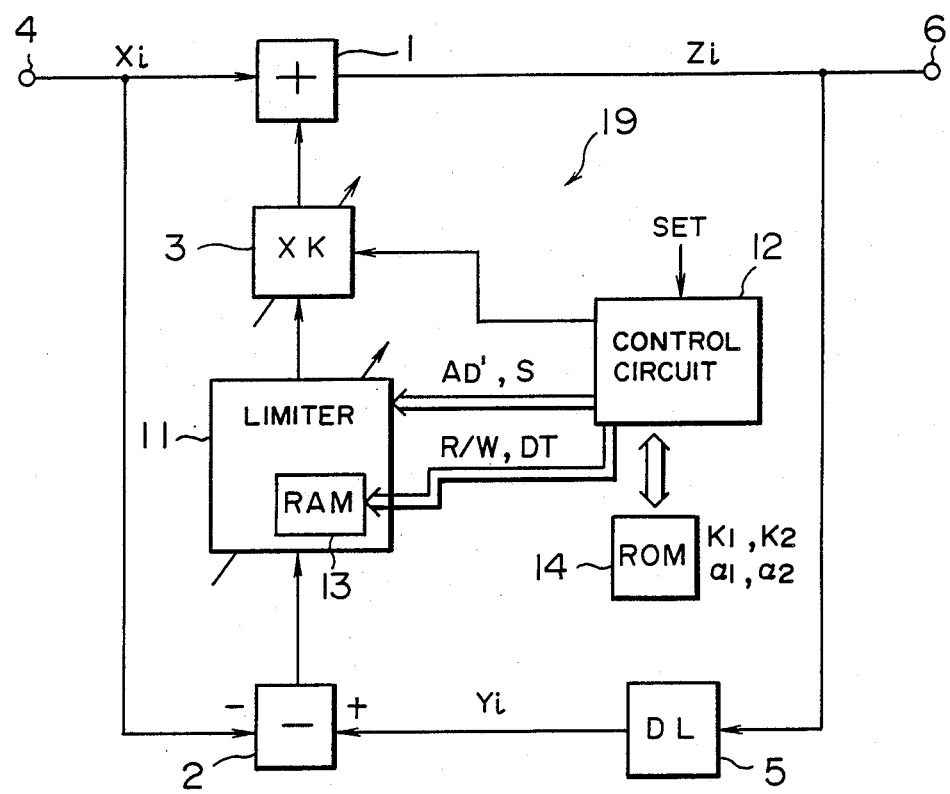
FIG. 15 is a block diagram showing another embodiment of a noise reducer according to the present invention.

FIG. 15 is a block diagram showing another embodiment of the digital noise reducer according to the present invention. In the characteristic adjustment circuit 19, a ROM 14 connected to the control circuit 12 and a RAM 13 contained in the limiter circuit 11 are added as new components.

Therefore, portions corresponding to those of FIG. 12 are denoted by identical symbols and will not be described repeatedly.

In FIG. 15, feedback coefficients $K_1$ and $K_2$ to be set into the variable coefficient multiplication circuit 3 and functions $\alpha_1$ and $\alpha_2$ of the input-output characteristic of the limiter circuit 11 corresponding respectively to the coefficients $K_1$ and $K_2$ are stored into the ROM 14 beforehand. On the basis of the user's setting, the control circuit 12 reads out the feedback coefficient $K_1$ or $K_2$ from the ROM 14 and sets it into the coefficient multiplication circuit 3. Further, the control circuit 12 also reads out an input-output characteristic datum (i.e. an output signal level corresponding to the input signal level) of the limiter circuit 11 corresponding to the feedback coefficient $K_1$ or $K_2$ thus read out, from the ROM 14, and then writes the input-output characteristics a and b based upon the datum thus read out into the RAM 13 of the limiter circuit 11. A datum corresponding to the difference signal $(Yi-Xi)$ output from the subtraction circuit 2 is read out from the RAM 13 and supplied to the variable coefficient multiplication circuit 3 as the output of the limiter circuit 11.

Figure 16:
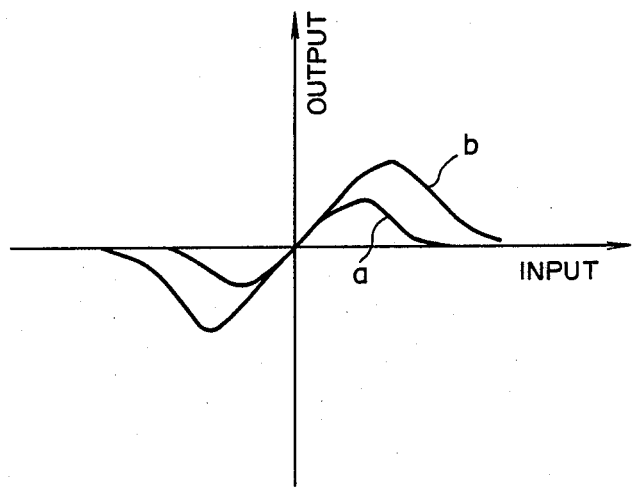
FIG. 16 shows an example of the input-output characteristic of the limiter circuit illustrated in FIG. 15.

As compared with the embodiment illustrated in FIG. 12, it is possible in the present embodiment to supply the input-output characteristic optimized more finely to the limiter circuit 11 and further reduce deterioration of resolution associated with each feedback coefficient. FIG. 16 shows an example of an input-output characteristic of the limiter circuit 11 for two different feedback coefficients $K_1$ and $K_2$.

Figure 17:
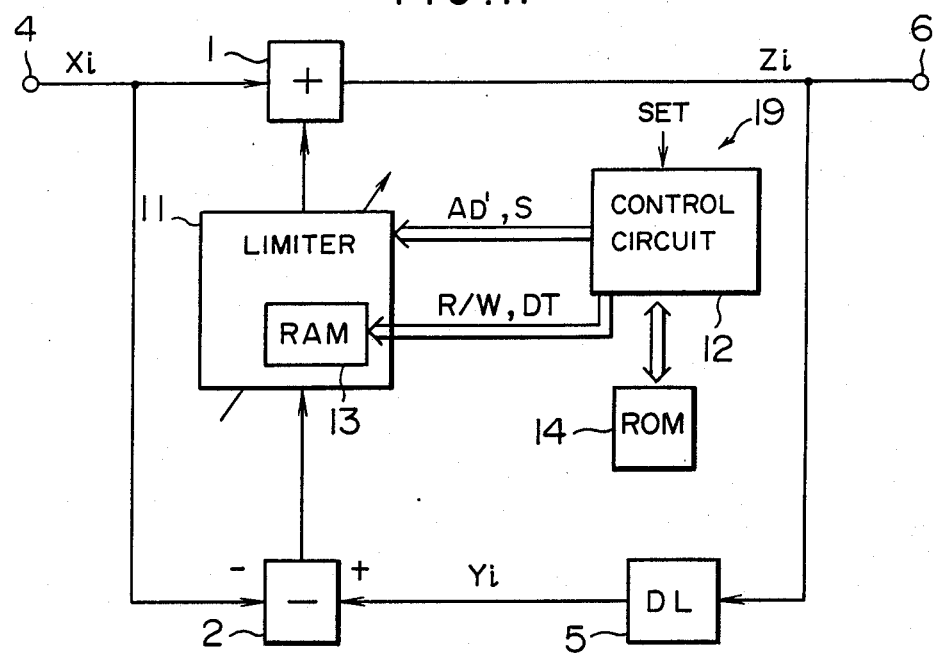
FIG. 17 is a block diagram showing a further embodiment of a noise reducer according to the present invention.

FIG. 17 is a block diagram showing a further embodiment of the digital noise reducer according to the present invention. Portions corresponding to those of FIG. 15 are denoted by identical symbols.

The embodiment shown in FIG. 15 also has a transfer function of the above described equation (8) where the feedback coefficient is $K'=K\cdot\alpha$ for the feedback coefficient K of the variable coefficient multiplication circuit 3 included in the characteristic adjustment circuit 19 and the function $\alpha$ representing the input-output characteristic of the limiter circuit 11. The embodiment illustrated in FIG. 17 is so configured that the input-output characteristic of the limiter circuit 11 may be represented by the feedback coefficient K'. As a result, the variable coefficient multiplication circuit can be omitted.

In FIG. 15, it is now assumed that the feedback coefficient K comprises $K_1$ and $K_2$, and the function $\alpha$ of the input-output characteristic of the limiter circuit 11 comprises $\alpha_1$ and $\alpha_2$ respectively corresponding to $K_1$ and $K_2$. In FIG. 17, input-output characteristic data (i.e. output signal levels corresponding to input signal levels) corresponding to $K_1'=K_1\cdot\alpha_1$ and $K_2'=K_2\cdot\alpha_2$ are stored in the ROM 14 beforehand. Upon a directive supplied from the outside, the control circuit 12 reads out the above described data, reads out the coefficient $K_1'$ or $K_2'$, and writes them into the RAM 13. A datum corresponding to the difference signal $(Yi-Xi)$ output from the subtraction circuit 2 is read out from the RAM 13 and supplied to the addition circuit 1 as the output of the limiter circuit 11.

Figure 18:
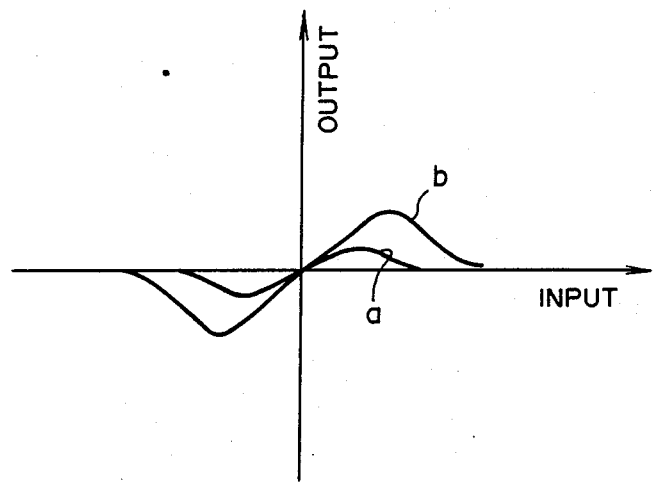
FIG. 18 shows an example of the input-output characteristic of the limiter circuit illustrated in FIG. 17.

FIG. 18 shows an example of an input-output characteristic of the limiter circuit 11.

Figure 19:
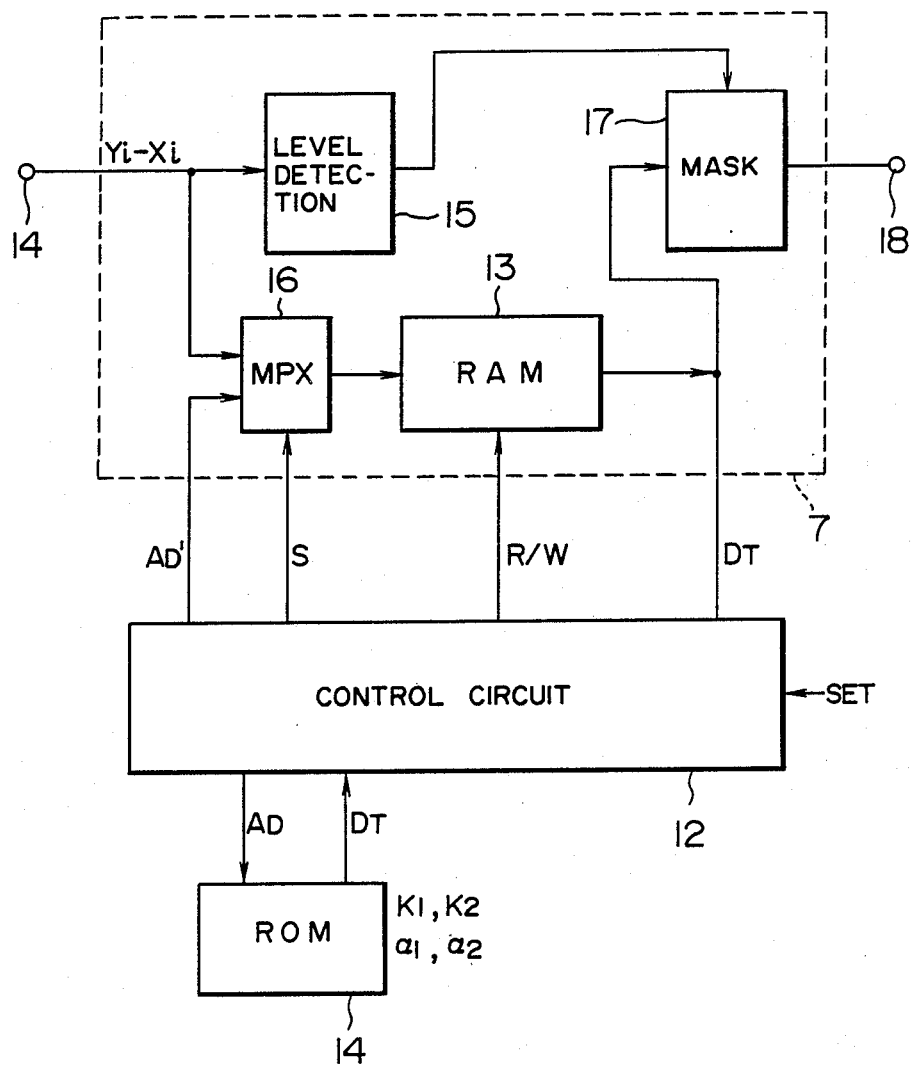
FIG. 19 is a block diagram showing a concrete example of the limiter circuit illustrated in FIGS. 15 and 17.

FIG. 19 is a block diagram showing a concrete example of the limiter circuit illustrated in FIGS. 15 and 17. Numeral 14 denotes an input terminal, 15 a level detection circuit, 16 a multiplexer, 17 a mask circuit, and 18 an output circuit. Portions corresponding to those of FIGS. 15 and 17 are denoted by identical symbols.

In case of the embodiment of FIG. 15, the feedback coefficients $K_1$ and $K_2$ as well as input-output characteristic data of the limiter circuit 11 respectively corresponding to $K_1$ and $K_2$ are stored beforehand in the ROM 14 shown in FIG. 19.

In case of the embodiment of FIG. 17, the coefficients $K_1'$ ($=K_1\cdot\alpha_1$) and $K_2'$ ($=K_2\cdot\alpha_2$) as well as input-output characteristic data respectively corresponding to $K_1'$ and $K_2'$ are stored beforehand in the ROM 14 shown in FIG. 19.

Writing of data stored in the ROM 14 into the RAM 13 will first be described.

When the user sets a desired improvement level, the control circuit 12 turns the RAM 13 into the write mode by using a read/write signal R/W and turns the multiplexer 16 into such a state as to select an address signal $A_D'$ supplied from the control circuit 12 by using a control signal S.

And, the control circuit 12 sends an address signal $A_D$ to the ROM 14 and sends the address signal $A_D'$ to the RAM 13 via the multiplexer 16. Upon this address signal $A_D$, an input-output characteristic datum corresponding to the function $\alpha_1$ or $\alpha_2$ based upon the user's setting is read out from the ROM 14 as a datum $D_T$ in case of the embodiment illustrated in FIG. 15. In case of the embodiment illustrated in FIG. 17, an input-output characteristic datum corresponding to a coefficient $K_1''$ or $K_2'$ depending upon a directive supplied from the outside is read out from the ROM 14 as a datum $D_T$. The datum $D_T$ thus read out is supplied to the RAM 13 via the control circuit 12. In the RAM 13, the data $D_T$ are successively written into addresses specified by the address signal $A_D'$.

As a result, the input-output characteristic of the limiter circuit 11 becomes as shown in FIGS. 16 or 18.

In this way, data are written into the RAM 13. When the difference signal (Yi−Xi) is to be processed by using the data thus written, the control circuit 12, which is supplied with a directive from the outside, makes the multiplexer 16 select the input terminal 14 by using the control signal S and turns the RAM 13 into the read mode.

The difference signal (Yi−Xi) input from the input terminal 14 is supplied to the level detection circuit 15 and supplied to the RAM 13 via the multiplexer 16. In the RAM 13, the difference signal (Yi−Xi) functions as an address signal, and a datum $D_T$ corresponding to the difference signal (Yi−Xi) is read out. This datum $D_T$ is output from the output terminal 18 via the mask circuit 17.

The level detection circuit 15 judges whether the difference signal (Yi−Xi) supplied from the input terminal 14 is equal to or larger than a certain constant level (hereafter referred to as a threshold level). When the difference signal is equal to or larger than the threshold level, the level detection circuit 15 controls the mask circuit 17 so as to interrupt the datum $D_T$ supplied from the RAM 13. In case where the output level may be made zero in the characteristics shown in FIGS. 16 and 18 when the input level is not lower than a constant level, this constant level can be used as the threshold level in the level detection circuit 15. Therefore, the RAM 13 need only memorize corresponding data up to the threshold level. It is thus possible to reduce the capacity of the RAM 13.

Further, in case where the output level always becomes constant when the input level is not lower than a certain constant level, it is also possible to use this constant level as the threshold level so that the mask circuit 17 may output the above described constant output level when the input level is not lower than the threshold level. In this case as well, the capacity of the RAM 13 can be reduced.

In FIGS. 15 and 17, it is also possible to use a ROM instead of the RAM 13 and store functions of the input-output characteristics corresponding to respective feedback coefficients into the ROM so that a function corresponding to a feedback coefficient set in the variable coefficient multiplication circuit 3 may be selected by the control circuit 12.

Further, in the embodiments shown in FIGS. 15 and 17 as well, relations among respective coefficients $K_1$ and $K_2$, $A_1$ and $A_2$, and function $\alpha$ can be set in the same way as the embodiment shown in FIG. 12.

Figure 20:
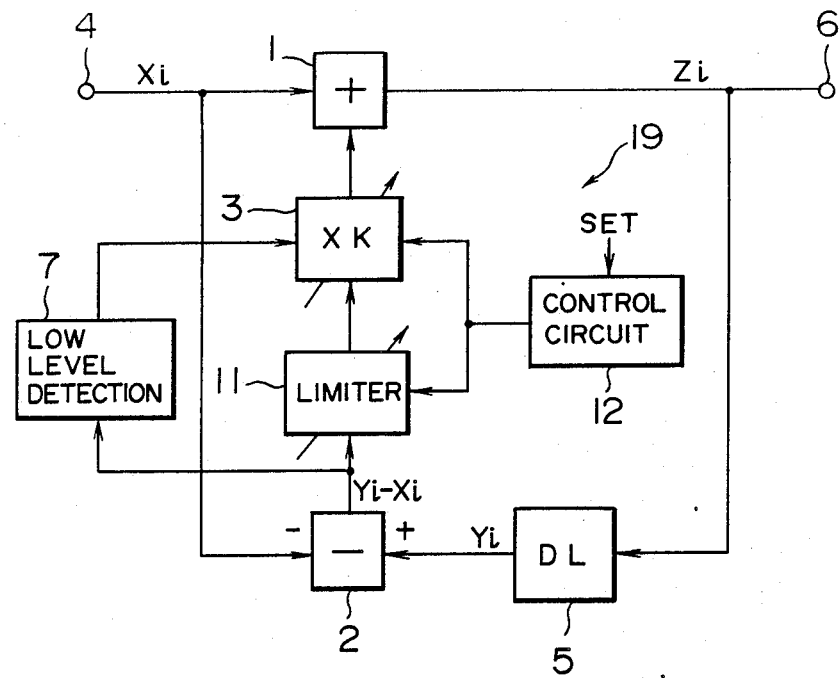
FIG. 20 is a block configuration diagram of a further embodiment comprising a combination of the configuration of FIG. 3 and the configuration of FIG. 12.

A further aspect of the present invention will now be described by referring to a block diagram shown in FIG. 20.

In this embodiment, the configuration of the embodiment shown in FIG. 3 is added to the configuration shown in FIG. 12. That is to say, the characteristic adjustment circuit 19 further includes a low level detector 7 in addition to the variable coefficient multiplier 3, the limiter circuit 11 and the control circuit 12 for controlling these two circuits. In this case, the coefficient K assumes such a value as to satisfy the relation $|(1-K)\cdot \Delta Xi|=1$ as described with respect to the embodiment of FIG. 3 at a portion of the input-output characteristic shown in FIG. 18 where the input signal level (i.e. the difference signal $\Delta Xi$) is small. In this region, therefore, the output signal level is lowered in accordance with that value.

Figure 2:
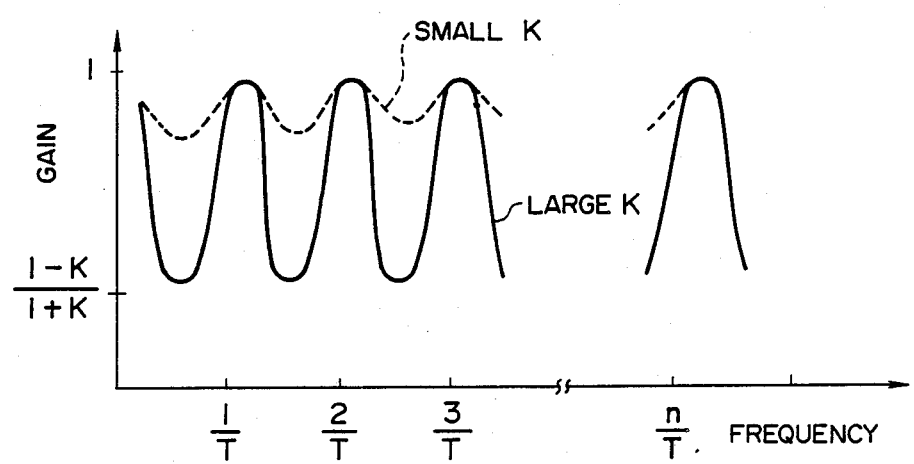
FIG. 2 is a characteristic diagram of the digital noise reducer shown in FIG. 1.

In the present embodiment, therefore, the variable coefficient multiplication circuit has the characteristic as shown in FIGS. 2 and 6, and the limiter circuit has the characteristic as shown in FIG. 13.

In each of the above described embodiments, it is prevented that the number of quantization bits is substantially reduced in the output signal and gradation errors are caused. In the output signal, gradations similar to those of the input signal are thus obtained. It is thus possible to obtain a picture of good quality with noises sufficiently suppressed. Further, the feedback coefficient and the input-output characteristic of the limiter circuit can be optimized in accordance with the signal-to-noise ratio of the input picture signal. Efficient improvement of the signal-to-noise ratio and prevention of resolution deterioration can be realized.

We claim:

1. A digital noise reducer comprising:
   an addition circuit for adding a digital input video signal supplied at a first input thereof and a signal supplied at a second input thereof and for outputting a resultant sum signal;
   a delay circuit for delaying the resultant sum signal of said addition circuit by an input unit period of said digital input video signal;
   a subtraction circuit supplied with said digital input video signal and an output signal of said delay circuit, said subtraction circuit forming and outputting a difference component signal based on said digital input video signal and the output signal of said delay circuit; and
   a characteristic adjustment circuit for manipulating a signal characteristic of a difference component of said subtraction circuit in accordance with the characteristic of the difference component signal outputted from said subtraction circuit and a characteristic of a digital output video signal outputted from said addition circuit and for outputting a resultant manipulated signal to said second input of said addition circuit; wherein said characteristic adjustment circuit comprises:
   a variable coefficient multiplication circuit supplied with the difference component signal of said subtraction circuit, said variable coefficient multiplication circuit multiplying the difference component signal by a variable feedback coefficient K and outputting a resultant product signal to said second input of said addition circuit; and
   low level detection means for detecting a value of the difference component signal of said subtraction circuit, for determining a low level region in which the absolute value of said difference component signal is smaller than a preset value, and for controlling the feedback coefficient K of said variable coefficient multiplication circuit so as to decrease the feedback coefficient K upon determination of the low level region.

2. The digital noise reducer according to claim 1, wherein said characteristic adjustment circuit further includes correlation detection means supplied with the difference component signal of said subtraction circuit, and said correlation detection means decreases the feedback coefficient K of said variable coefficient multiplication circuit when said difference component signal is larger than a preset value and degree of correlation of digital video signals preceding and succeeding with said input unit period becomes low.

3. The digital noise reducer according to claim 2, wherein
said addition circuit comprises a first addition circuit for performing addition to output said digital video signal and a second addition circuit for calculating a signal to be supplied to said delay circuit;
said variable coefficient multiplication circuit comprises a first variable coefficient multiplication circuit for multiplying the difference component signal of said subtraction circuit by a variable feedback coefficient $\alpha$ and for outputting a resultant product signal to said first addition circuit and a second variable coefficient multiplication circuit for multiplying the difference component signal of said subtraction circuit by a variable coefficient K and for outputting a resultant product signal to said second addition circuit; and
said low level detection means controls variable coefficients $\alpha$ and K of said first and second variable coefficient multiplication circuits, and said correlation detection means also controls the variable coefficients $\alpha$ and K of said first and second variable coefficient multiplication circuits in the same way.

4. The digital noise reducer according to claim 3, wherein said variable coefficients $\alpha$ and K are chosen so as to satisfy relation:

$$\alpha = K + \tfrac{1}{4}.$$

5. The digital noise reducer according to claim 2, wherein assuming that said feedback coefficient K in a region other than said low level region is $K_o$, a region in which the absolute value of said difference component signal satisfies relation $|\Delta Xi| < 1/1 - K_o$ is regarded as said low level region, and
the feedback coefficient K in said low level region is so chosen as to satisfy relation:

$$(1-K) \cdot |\Delta Xi| = 1$$

when $1 \leq |\Delta Xi| < 1/1 - K_o$.

6. The digital noise reducer according to claim 3, wherein assuming that said feedback coefficient K in a region other than said low level region is $K_o$, a region in which the absolute value of said difference component signal satisfies relation $|\Delta Xi| < 1/1 - K_o$ is regarded as said low level region, and
the feedback coefficient K in said low level region is so chosen as to satisfy relation:

$$(1-K) \cdot |\Delta Xi| = 1$$

when $1 \leq |\Delta Xi| < 1/1 - K_o$.

7. The digital noise reducer according to claim 1, wherein said characteristic adjustment circuit comprises:
a limiter circuit supplied with the difference component signal of said subtraction circuit, said limiter circuit limiting the difference component signal level by a function $\alpha$ and outputting the difference component signal level thus limited;
a variable coefficient multiplication circuit for multiplying the output of said limiter circuit by a variable feedback coefficient K; and
a control circuit for setting the feedback coefficient K of said variable coefficient multiplication circuit and for setting an input-output characteristic depending upon the coefficient K set in said variable coefficient multiplication circuit into said limiter circuit.

8. The digital noise reducer according to claim 7, wherein said limiter circuit comprises a rewritable memory for storing therein the function $\alpha$ prescribing the input-output characteristic, for reading out from said memory a datum corresponding to the difference component signal supplied from said subtraction circuit, and for outputting the datum thus read out.

9. The digital noise reducer according to claim 8, wherein said variable coefficient multiplication circuit and said limiter circuit comprises a limiter circuit containing therein a memory, which is controlled by a control circuit to rewrite the coefficients K and $\alpha$ stored therein.

10. The digital noise reducer according to claim 9, wherein assuming that the feedback coefficient K set in said variable coefficient multiplication circuit comprises $K_1$ and $K_2$ (where $K_2 > K_1$), limiter levels of said limiter circuit corresponding to $K_1$ and $K_2$ are $A_1$ and $A_2$ (where $A_2 > A_1$), and said difference component signal is (Yi−Xi), values of the function $\alpha$ are so prescribed that:

(i) When $K = K_1$, $\alpha = 1$ if $|Yi - Xi| < A_1$, $\alpha = A_1/|Yi - Xi|$ if $|Yi - Xi| \geq A_1$, (ii) When $K = K_2$, $\alpha = 1$ if $|Yi - Xi| < A_2$, $\alpha = A_2/|Yi - Xi|$ if $|Yi - Xi| \geq A_2$.

11. The digital noise reducer according to claim 7, wherein said limiter circuit comprises a ROM for storing therein input-output characteristic functions depending upon the variable feedback coefficient K to be set into said variable coefficient multiplication circuit, and an input-output characteristic function corresponding to the feedback coefficient K set in said variable coefficient multiplication circuit for selection by said control circuit.

12. The digital noise reducer according to claim 7, wherein assuming that the feedback coefficient K set in said variable coefficient multiplication circuit comprises $K_1$ and $K_2$ (where $K_2 > K_1$), limiter levels of said limiter circuit corresponding to $K_1$ and $K_2$ are $A_1$ and $A_2$ (where $A_2 > A_1$), and said difference component signal is (Yi−Xi), values of the function $\alpha$ are so prescribed that:

(i) When $K = K_1$, $\alpha = 1$ if $|Yi - Xi| < A_1$, $\alpha = A_1/|Yi - Xi|$ if $|Yi - Xi| \geq A_1$, (ii) When $K = K_2$, $\alpha = 1$ if $|Yi - Xi| < A_2$, $\alpha = A_2/|Yi - Xi|$ if $|Yi - Xi| \geq A_2$.

13. The digital noise reducer according to claim 7, further comprising low level detection means for detecting a value of the difference component signal of said subtraction circuit, for determining a low level region in which the absolute value of said difference component signal is smaller than a preset value, and for controlling the feedback coefficient K of said variable coefficient multiplication circuit so as to decrease the feedback coefficient K upon determination of the low level region.

14. The digital noise reducer according to claim 8, wherein assuming that the feedback coefficient K set in said variable coefficient multiplication circuit comprises $K_1$ and $K_2$ (where $K_2 > K_1$), limiter levels of said limiter circuit corresponding to $K_1$ and $K_2$ are $A_1$ and $A_2$ (where $A_2 > A_1$), and said difference component signal is (Yi−Xi), values of the function $\alpha$ are so prescribed that:

(i) When $K = K_1$, $\alpha = 1$ if $|Yi - Xi| < A_1$, $\alpha = A_1/|Yi - Xi|$ if $|Yi - Xi| \geq A_1$, (ii) When $K = K_2$, $\alpha = 1$ if $|Yi - Xi| < A_2$, $\alpha = A_2/|Yi - Xi|$ if $|Yi - Xi| \geq A_2$.

15. The digital noise reducer according to claim 11, wherein assuming that the feedback coefficient K set in said variable coefficient multiplication circuit comprises $K_1$ and $K_2$ (where $K_2 > K_1$), limiter levels of said limiter circuit corresponding to $K_1$ and $K_2$ are $A_1$ and $A_2$ (where $A_2 > A_1$), and said difference component signal is (Yi−Xi), values of the function $\alpha$ are so prescribed that:

(i) When $K = K_1$, $\alpha = 1$ if $|Yi - Xi| < A_1$, $\alpha = A_1/|Yi - Xi|$ if $|Yi - Xi| \geq A_1$, (ii) When $K = K_2$, $\alpha = 1$ if $|Yi - Xi| < A_2$, $\alpha = A_2/|Yi - Xi|$ if $|Yi - Xi| \geq A_2$.

16. A digital noise reducer comprising:
an addition circuit for adding a digital input video signal supplied at a first input thereof and a signal supplied at a second input thereof and for outputting a resultant sum signal;
a delay circuit for delaying the resultant sum signal of said addition circuit by an input unit period of said digital input video signal;
a subtraction circuit supplied with said digital input video signal and an output signal of said delay circuit, said subtraction circuit forming and outputting a difference component signal based on said digital input video signal and the output signal of said delay circuit; and
a characteristic adjustment circuit for manipulating a signal characteristic of a difference component of said subtraction circuit in accordance with the characteristic of the difference component signal outputted from said subtraction circuit and a characteristic of a digital output video signal outputted from said addition circuit and for outputting a resultant manipulated signal to said second input of said addition circuit;
wherein assuming that said feedback coefficient K in a region other than said low level region is $K_o$, a region in which the absolute value of said difference component signal satisfies relation $|\Delta Xi| < 1/1 - K_o$ is regarded as said low level region and the feedback coefficient K in said low level region is so chosen as to satisfy relation $(1 - K) \cdot |\Delta Xi| = 1$ when $l \leq |\Delta Xi| < \frac{1}{1 - K_o}$.

* * * * *